United States Patent Office 3,184,397
Patented May 18, 1965

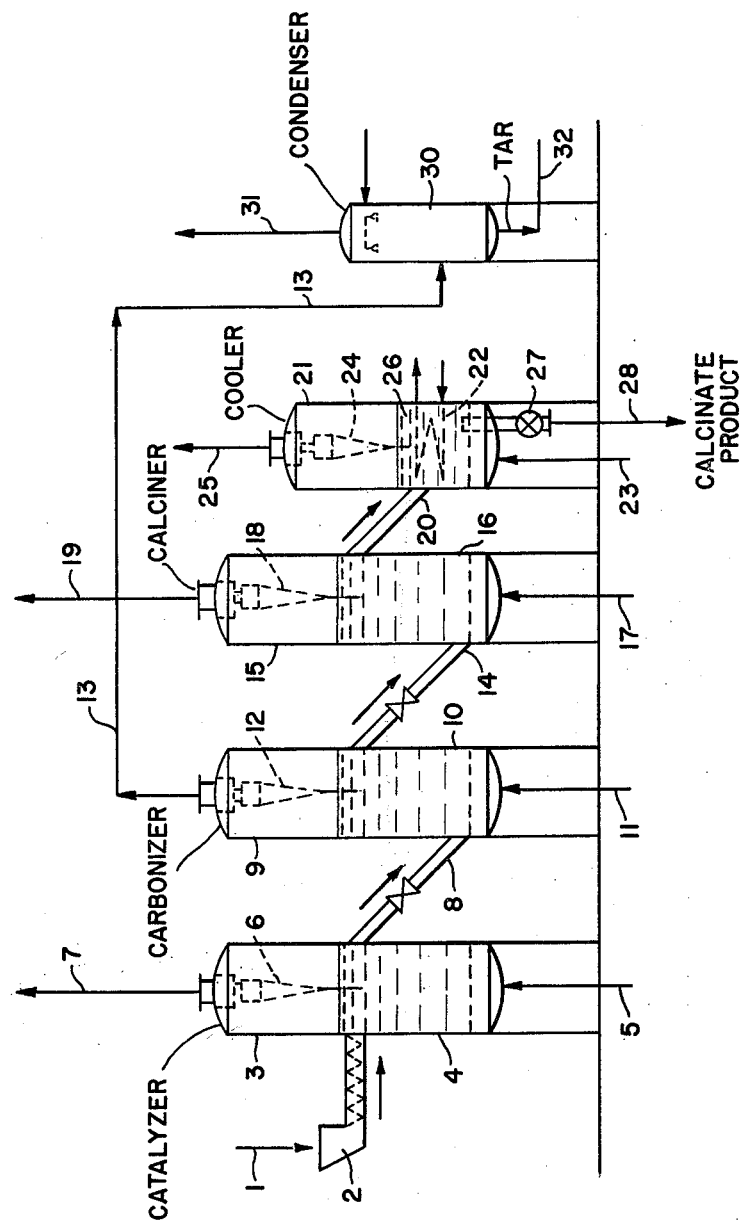

3,184,397
AMORPHOUS CARBONACEOUS MATERIAL
Josiah Work, New Canaan, Conn., Robert T. Joseph, Richboro, Pa., and John H. Blake, Boulder, Colo., assignors to FMC Corporation, a corporation of Delaware
Filed May 24, 1960, Ser. No. 31,316
2 Claims. (Cl. 202—35)

This application is directed to the calcinate product produced by the process of our co-pending application Serial No. 821,137, filed June 18, 1959, now Patent No. 3,140,241, and is a continuation-in-part of said application.

This invention relates to chemically reactive carbonaceous material useful as a raw material for water gas or other gas reactions, for effecting the reduction of ores and for other uses.

Amorphous, graphite and diamond are known classes of carbon, which differ from each other, chiefly in the type and the degree of crystallinity. Amorphous carbons and carbonaceous materials are a haphazard arrangement of small crystals called crystallites; they are glass-like in structure, disordered, unoriented and without definable form. Graphite is a highly ordered and oriented grouping of two dimensional plates which form the crystal pattern. Diamond is a highly ordered, transparent crystal possessed of refractive properties which give this material its gem status. There are several forms of diamond, one form of graphite, and numerous forms of amorphous carbons. In the production of substantially all amorphous carbonaceous materials some graphitization occurs, usually the higher the temperature to which the carbonaceous material is subjected during processing the more graphitization which takes place; the greater the graphitization the less reactive is the resultant carbonaceous material.

The carbonaceous materials embodying the present invention are novel amorphous carbonaceous materials in particulate form, which particles differ from amorphous carbons and carbonaceous materials heretofore known, particularly in that they are relatively high density materials and yet have (1) a markedly lesser degree of ordering of the carbon crystals and less graphitization, as demonstrated, for example, by their orientation index factors, hereinafter explained, (2) a greater absorbent capacity for helium and other gases, (3) the property of reacting uniformly with steam and carbon dioxide, i.e., substantially all portions of the particles react at the same rate under the same conditions, (4) a surprisingly high hydrogen content or, stated otherwise, a surprisingly low carbon to hydrogen ratio on a weight basis; and are (5) remarkably more reactive with steam and carbon dioxide.

Preferred products of the present invention are in particulate form; the individual particles are strong, abrasive-resistant, homogeneous, and have a size such that on the average 100% will pass through a ⅛-mesh screen and about 95% retained on a 325-mesh screen. The particles are irregular but, in general, equi-dimensional, have an average particle size of from $5 \times 10^6$ A. to $5 \times 10^5$ A., a vitreous appearance, a hardness of about 6 on the Moh scale, an orientation index factor of from 1.2 to 2.8, preferably 1.3 to 2.5, a real density (water displacement) of from 1.6 to 2.0, an apparent helium density of from 2.4 to 4, a ratio of apparent helium density to real density (water displacement) above 1.3, preferably 1.3 to 2.5, interplaner spacing as determined by X-ray diffraction of from 3.6 to 2.9 A., a reactivity with carbon dioxide above 10%, preferably above 15%, and a reactivity with water vapor above 20%. They have a surface area, BET nitrogen, of 50 to 500 square meters per gram. The surfaces of the particles are peculiarly susceptible to the formation of strong carbon to carbon bonds with carbon derived from tars and pitches produced in the production of the amorphous carbonaceous particles or from coal tar pitch or other such bituminous binders, with consequent formation of strong internal three-dimensional bonds to produce a massive form having high structural strength such that the resultant massive shapes are eminently suited for metallurgical uses.

The particles have a carbon content of at least 90% on an ash and moisture-free basis; a hydrogen to carbon atomic ratio of from 0.1 to 0.2, which corresponds to a carbon to hydrogen ratio on a weight basis of from 60 to 90, and contain not more than 5% by weight, preferably not more than 3% by weight of volatile material.

In Table 1 which follows is given a comparison of the chemical and physical properties of five (identified in Table 1 as I, II, III, IV and V, respectively) amorphous carbonaceous products of the present invention, with four other carbonaceous materials (identified as A, B, C and D). As described more fully hereinafter, carbonaceous material A is a Lurgi Type coke made from sub-bituminous coke; B is a commercial by-product coke; C is a beehive coke; and D is a coked petroleum still residue. Materials A, B, C and D were selected because they are believed to be best representative of prior known amorphous carbonaceous materials.

The carbonaceous products of this invention, I to V, inclusive, were produced from different ranks of coals, including lignite identified in Table 2 below, by the process disclosed and claimed in our aforesaid copending patent application and the conditions of the steps of which process are given in Table 3 below.

In Table 1:
ASG is the apparent specific gravity and is obtained by weight measurement of the mercury displaced by 10 grams of the solids.

Surface area BET means the surface area determined by the standard Brunner, Emmett and Teller method, using nitrogen as the gas being adsorbed. The values are given in square meters per gram.

Real density means the density determined by the standard water displacement method. The values are given in grams per cubic centimeter.

Helium density means the apparent helium displacement as determined by the standard method involving displacement of helium. The values are given in grams per cubic centimeter; these values were determined by the technique described on pages 15, 16 and 17 of the thesis entitled "Some Physical and Chemical Properties of Carbon and Graphite Electrodes Prepared from Anthracite" dated January 1959, by Irwin Geller of the Graduate School of Pennsylvania State University, Department of Fuel Technology.

Helium solution ratio means the ratio of helium density to real density. This ratio is indicative of the nature of the inter-molecular structure of the carbon. The higher the ratio the more absorptive is the carbon of helium and other gases.

X-ray diffraction gives the values of the interplanar distance ($d$ spacing at the 002 index) in A. units. This value indicates the distance between the molecular units or platelets as determined by the scatter of X-rays from a constant source and of a constant frequency as the beam of these rays scans the powdered specimen over an angular range of approximately 180°.

Orientation index factor is the ratio of $I_p$ to $I_b$ where $I_p$ is the uncorrected peak intensity of the 002 region of the X-ray diffraction as recorded and $I_b$ is the interpolated background intensity at the same $d$ value.

Hardness is the Moh hardness index measured using the standard "Moh hardness" scale.

The test employed to determine pyrophoricity involves placing a mass 18 inches in diameter and 36 inches high in a closed container; if the mass is spontaneously ignited by reaction with the air trapped in the container when the temperature of the mass rises above 250° to 300° F., the material is classified as pyrophoric. The expression pyrophoric is used herein in this sense. In the table the letter P indicates the material in question is pyrophoric, NP that it is not pyrophoric.

$CO_2$ reactivity is determined by ascertaining the amount of the test sample, sized to pass through a 20-mesh but retained on a 28-mesh Tyler screen, consumed in one hour in a stream of carbon dioxide at 900° C. and passed over the sample at a rate of 400 ml./min. in a tube of about 1 inch inside diameter.

Water reactivity is determined by ascertaining the amount of the sample, sized to pass through a 20-mesh but retained on a 28-mesh Tyler screen, consumed in one hour in a stream of steam at 825° C. passed over the sample at a rate of 133 ml./min. in a tube of about 1 inch inside diameter.

Each sample was crushed and screened. Particles that passed through 20-mesh but were retained on 28-mesh (Tyler screen size) were used. 500 milligrams weighed out on a balance of 0.1% sensitivity, were placed in a "Gooch" crucible cut down to fit with clearance in the silica tube of the furnace. The sample made a bed of ⅝ inch in diameter and ¼ inch deep. The samples in both the $CO_2$ reactivity and water reactivity tests were first flushed clean of air by passing argon thereover at a rate of 370 ml./min. for ten minutes.

The chemical analyses were made by procedures outlined in the Bureau of Mines Bulletin No. 492, entitled "Methods of Analyzing Coal and Coke" by A. C. Fieldner and W. A. Selvig. The values given are in weight percent, on a dry basis.

VM means volatile matter; the other abbreviations under "Chemical Analysis" are the chemical symbols or formulae for the elements and compounds identified thereby.

C/H is the carbon to hydrogen weight ratio.

of the comparative products (.46 to .75) and a carbon to hydrogen ratio on a weight basis of from 69 (III) to 86 (IV), markedly lower than the carbon to hydrogen ratio for the comparative products (127 to 210).

It will be further noted that the carbonaceous products of the present invention have an orientation index factor of from within the range of 1.2 to 2.8, as compared with 3.03 for by-product coke-oven coke and 4.7 for petroleum coke. Hence it is apparent that the carbonaceous products of the present invention show a markedly lesser degree of ordering of the carbon crystals than in the by-product coke-oven coke and petroleum coke. The helium density to real density ratio of the products of the present invention is above 1.3. The comparative products, on the other hand, have values of 1 or less for this ratio, demonstrating that the carbonaceous products of the present invention have remarkably more absorbent capacity for helium and other gases than the comparative carbonaceous products.

The $CO_2$ reactivity of the products of the present invention is at least 10% whereas the $CO_2$ reactivity of the comparative products is within the range of from 1% to 2.4%. Thus the products of the present invention show an increase in reactivity with $CO_2$ of the order of five-fold or greater. The water vapor reactivity of the products of the present invention is above 20%; the particular products tested showed water vapor reactivities of from 25% to 67%. The comparative products, on the other hand, showed water vapor reactivities of from 2% to 3.5%.

The markedly greater $CO_2$ and water vapor reactivities of the amorphous carbonaceous products of the present invention is confirmatory of the orientation index values which, being lower, establish that in the products of the present invention less graphitization took place and hence are chemically more reactive than the comparative products. Moreover the products of the present invention react uniformly with carbon dioxide and steam and in this respect differ also from prior known carbonaceous materials.

TABLE 1

| | I | II | III | IV | V | A | B | C | D |
|---|---|---|---|---|---|---|---|---|---|
| Physical properties: | | | | | | | | | |
| ASG | 1.20 | 0.710 | 0.700 | 0.770 | 1.12 | 1.25 | 1.00 | 1.00 | 1.30 |
| Surface area BET | 282 | 29.1 | 60 | 213 | 401 | | 23.7 | 6.0 | 0.8 |
| Real density | 1.78 | 1.77 | 1.75 | 1.85 | 1.97 | 1.90 | 2.18 | 1.94 | 1.83 |
| Helium density | 2.97 | 2.45 | 2.52 | 3.78 | 3.28 | 1.90 | 1.74 | 1.86 | 1.66 |
| Helium solution ratio | 1.67 | 1.38 | 1.44 | 2.04 | 1.66 | 1.00 | .8 | .96 | .91 |
| X-ray diffraction | 3.82 | 3.82 | 3.85 | 3.77 | 3.71 | | 3.51 | | 3.56 |
| Orientation index factor | 1.80 | 1.67 | 1.55 | 1.51 | 1.33 | | 3.03 | | 4.07 |
| Hardness-Moh scale | 6 | 6 | 6 | 6 | 6 | | 6 | 6 | 6 |
| Chemical reactivities: | | | | | | | | | |
| Phyrophoricity | P | P | P | P | P | NP | NP | NP | NP |
| $CO_2$ reactivity, percent | 31 | 10 | 21 | 15 | 70.4 | | 2.4 | 1.6 | 2.5 |
| $H_2O$ reactivity, percent | 46 | 26 | 27 | 25 | 67 | | 2.8 | 2.0 | 3.0 |
| Proximation analysis—Moisture and ash free basis, percent by weight: | | | | | | | | | |
| VM | 2.0 | 2.50 | 2.50 | 2.50 | 3.00 | 0.5 | 0.5 | 0.1 | 0.2 |
| Fixed carbon | 98.00 | 97.50 | 97.50 | 97.50 | 97.00 | 99.5 | 99.5 | 99.9 | 99.8 |
| Ultimate analysis—Moisture and ash free basis, percent by weight: | | | | | | | | | |
| Carbon | 95.10 | 92.55 | 95.01 | 95.75 | 96.00 | 98.68 | 95.58 | 96.50 | |
| $H_2$ | 1.35 | 1.25 | 1.38 | 1.11 | 1.20 | 0.58 | 0.75 | 0.46 | |
| $N_2$ | 1.33 | 1.49 | 1.56 | 1.42 | 1.28 | 0.11 | 1.30 | 0.92 | |
| S | 0.46 | 0.45 | 0.49 | 0.53 | 0.58 | 0.52 | 1.33 | 0.62 | |
| $O_2$ by difference | 1.76 | 4.26 | 1.26 | 1.19 | 0.94 | 0.10 | 1.04 | 1.50 | |
| $H_a/C_a$ | 0.170 | 0.162 | 0.174 | 0.139 | 0.150 | 0.071 | 0.094 | 0.057 | |
| C/H | 71 | 74 | 69 | 86 | 80 | 170 | 127 | 210 | |
| Ash content—Moisture free basis: Ash | 5.82 | 3.09 | 11.76 | 13.09 | 23.18 | 5.80 | 10.52 | 5.41 | |

$H_a/C_a$ is the hydrogen to carbon atomic ratio.

Products I to V, inclusive, had an average particle size of from 2 to $3 \times 10^6$ A.

It will be noted that the carbonaceous products of the present invention have a real density of from 1.75 (III) to 1.97 (V), (the comparative products have real densities of 1.83 to 2.18) and yet have a hydrogen content (on a moisture and ash free basis) of from 1.11 (IV) to 1.38 (III), much greater than the hydrogen content In the accompanying drawing the single figure shows a preferred arrangement of equipment for carrying out the process of producing the carbonaceous product embodying the present invention. In the drawing, 1 indicates the pulverized coal feed to a screw conveyor 2 which discharges continuously into the catalyzer 3. The catalyzer contains a fluidized bed 4 of the pulverized coal particles. The fluidized bed 4 is activated by a hot gas stream 5 containing steam and air. The hot gas stream 5 may be controlled to maintain the desired atmosphere in the catalyzer 3. The catalyzer is equipped with an internal cyclone separator 6 through which gases evolved in the catalyzer are discharged through line 7. The cyclone separator 6 also removes entrained coal particles from the gas and returns the particles to the fluidized bed 4.

The catalyzer 3 discharges coal continuously through line 8 into the carbonizer 9. The carbonizer contains a fluidized bed 10 of the catalyzed coal particles. A stream of hot air and inert gas 11 is supplied as the fluidizing medium. The carbonizer 9 is equipped with an internal cyclone separator 12 through which gases evolved in the carbonizer are discharged. A gas take-off line 13 leads from the cyclone separator 12 to the condenser 30 hereinafter described. The cyclone separator 12 also removes char particles from the gas and returns the particles to the fluidized bed 10.

The carbonizer 9 discharges char continuously through line 14 into the calciner 15. The calciner contains a fluidized bed 16 of the char particles. A stream of hot air and inert gas 17 is supplied as the fluidizing medium. The calciner 15 is equipped with an internal cyclone separator 18 through which fuel gas evolved in the calciner 15 is discharged through line 19. The cyclone separator 18 also removes char particles from the fuel gas and returns the particles to the fluidized bed 16.

The calciner 15 discharges calcined char continuously through line 20 into the cooler 21. The cooler contains a fluidized bed 22 of calcined char particles fluidized by a stream of inert gas supplied through line 23. The cooler is equipped with an internal cycline separator 24 through which gases are discharged through line 25. The cycline separator also removes char particles from the gas and returns the particles to the fluidized bed 22. The cooler 21 is also equipped with internal cooling coils 26 through which a suitable cooling medium may be circulated. Calcinate product is continuously discharged from the cooler 21 through a rotary valve 27 controlling flow through a line 28.

Preferably tar is recovered from the gases evolved in the carbonizer 10. For this purpose, condenser 30 is employed, which condenser is supplied with a circulating cooling liquid to condense the tar and a portion of the water vapor in the gas which enters the condenser 30 from line 13. Fuel gas leaves the condenser through line 31. Tarry condensate leaves the condenser 30 through line 32 and is discharged into a decanter (not shown).

The preferred conditions that are generally applicable to lignites, high volatile non-coking coals, and coking coals of each of the stages will now be described in detail.

The grinding stage

In the practice of this invention, the coal, if not already of the required finely divided size, may be ground by any standard grinding and sizing technique to produce a natural distribution particle size, substantially all of which passes a No. 8 mesh screen and at least 95% of which is retained on a No. 325 mesh screen and with a minimum quantity of fines of a size which would escape from the cyclone of the fluidizing bed reactors. This is readily accomplished by grinding in a hammer mill.

The catalyzing stage

These finely ground parent coal particles are first subjected to pretreatment, desirably in a fluidized bed, but alternatively in a dispersed phase, to promote, presumably, the formation of peroxide and hydroperoxide catalysts. This is best accomplished in an atmosphere containing oxygen, the concentration of which will vary inversely with the oxygen concentration of the coal being so catalyzed. The practical range is 1% to 20% by volume in the entering fluidizing medium, depending on the rank of the coal. For low rank, non-coking coals, a volume of oxygen at or near the lower limit of this range is employed, e.g., from 1% to 8% by volume; for coking coals, a volume of oxygen in the upper part of this range is used, e.g., from 8% to 20% by volume. In general, the concentration of oxygen used will be that optimum quantity of oxygen which will add to the coal matrix and thus provide a source of oxygen for catalyst formation and inhibition of agglomerating tendencies if present, without causing an uncontrolled combustion in this catalyzing stage or in the later stages of the process. In the case of high oxygen-containing coals, i.e., coals containing in excess of 12% oxygen, it is not necessary to add additional oxygen to the entering fluidizing medium employed in the catalyzing stage.

In this catalyzation of non-coking coals, including lignites, the fluid bed is normally maintained at a temperature of 250° F. to 500° F.; for coal possessing caking and coking characteristics, in order to promote the secondary effect of destroying these characteristics, the bed is maintained at a temperature of 500° F. to 800° F. The maximum of the range is that point in temperature at which hydrocarbon vapors, the tar precursors, begin to be evolved. The lower limit is that temperature necessary to reduce the moisture content to 2% or less, or, in the case of coal with less than 2% moisture, that temperature at which oxygen can be added to the coal matrix.

In carrying out this catalyzation, the parent coal may be introduced into a cold fluid bed and subjected to a gradual rise in temperature to the range indicated. Preferably, the parent coal is introduced continuously into a fluid bed maintained at the desired temperature, wherein the heating rate will be of shock or instantaneous magnitude, for one second or less.

When heating the coal particles under fluidizing conditions, the coal particles should remain in the fluid bed for an average residence time of at least 5 minutes, and preferably from 5 minutes to 3 hours. This catalyzing may be accomplished in times as low as 10 minutes, or as high as 180 minutes, without the occurrence of deleterious effects on the final product. The temperature of catalyzation, within the ranges given, bears an inverse relationship to the residence time. In catalyzation of non-coking coals at temperatures in the lower portion of the range of 250° F. to 500° F., the times should be in the upper portion of the residence range. On the other hand, when operating at the higher temperatures, near 500° F., the residence time should be in the lower portion of this time range. Similarly, when processing coking coals, longer residence times within the range of from 5 minutes to 3 hours are employed when operating near 500° F. and the shorter residence times when operating near 800° F.

The fluidizing medium, desirably steam or flue gas diluted with air or oxygen, if added, is introduced at a pressure of from 2 to 30 p.s.i.g. The fluidizing medium is introduced at a velocity to give the desired "boiling bed" conditions, e.g., from about 0.5 to 2 feet per second superficial velocity.

Heating of the finely divided coal particles in the fluidized bed may be effected by burning a small portion of the coal by sensible heat introduced in the fluidizing medium or by indirect heat exchange.

In lieu of effecting catalyzation of the coal in a fluidized bed, the finely divided coal particles may be subjected to heating in a dispersed phase, i.e. dispersed in a suitable gaseous medium (e.g. flue gas, nitrogen or carbon dioxide containing oxygen, within the limits heretofore prescribed) of sufficient velocity to maintain the particles in the dispersed phase rather than in the "dense" phase, as in a fluidized bed. Utilizing dispersed-phase heating, non-coking coals are heated to a temperature of 350°–750° F. for about 3 seconds. Coking coals are heated to a temperature of 750°–1000° F. for about 3 seconds.

Catalyzation, as hereinabove described:

(1) Conditions the parent coal so that in further processing in the succeeding stages, a controlled amount of polymerization occurs which effectively increases the strength and thickness of the pore walls while permitting a predetermined amount of the coal constituents to evolve as gas and vapors.

(2) Effects the removal of contained moisture when hydrous coals are treated;

(3) In the case of coals which have a tendency to agglomerate, the treatment inhibits this tendency.

These effects are accomplished without sacrifice of the density-of-structure characteristic of the parent coal.

The Carbonizing Stage

Carbonization is carried out by subjecting the catalyzed coal particles to a further heat treatment in a fluidized bed where the heat requirements are supplied, preferably, by the oxidation of a limited amount of the catalyzed coal or of the hydrocarbon vapors derived therefrom. This oxidation is controlled by the admission of only that amount of oxygen necessary to produce the desired temperature level. This oxygen is admitted to the bed in the form of air as a component of the fluidizing medium, the remainder of which may be steam, nitrogen, flue gas, carbon dioxide, carbon monoxide, or any gas which is not reactive with the catalyzed coal in this stage. Alternatively, heat may be supplied externally by use of heat exchangers.

In this stage, the catalyzed coal particles are heated under conditions which are controlled to produce a char having the desired optimum properties. The optimum conditions of the carbonizing stage will vary from coal to coal and may be determined for each rank of coal processed by prior laboratory evaluation in bench-scale apparatus.

Temperature and residence time are critical. The lower limit of temperature is that temperature at which the activated coal begins to evolve tar-forming vapors in quantity and this temperature is the same as the upper limit of the catalyzing stage for any given coal, i.e., 800° F. for coking coals and 500° F. for non-coking coals.

The upper limit of temperature is that temperature above which the expanding coal particles form cracks, fissures and bubbles to such an extent that retraction to the size and shape of the original coal particle cannot occur. This upper temperature limit is approximately 1150°–1200° F. In general, the higher the temperature of carbonization (within the lower and upper limits), the greater the quantity of tar produced.

The fluidizing gas should enter the bed at a temperature not much below the temperature of the fluidized bed and not more than 20° F. above this temperature; if this fluidizing medium is introduced at a much lower temperature than the bed, more of the catalyzed coal and hydrocarbon vapors will have to be burned in order to supply the heat necessary to raise the fluidizing medium to bed temperature, thereby reducing product yields. If the fluidizing gases enter the bed at a temperature of more than 20° F. above the temperature of the bed, weak nonuniform char results.

The fluidizing medium is introduced at such superficial velocities as will effect the desired fluidization pattern, usually 0.5 to 2 feet per second and, desirably, at pressures consistent with the smooth operation of the whole process, e.g., 2 to 30 p.s.i.g., preferably about 5 p.s.i.g.

The material in the bed is maintained at the aforementioned bed temperature for 10 to 60 minutes. The residence time at this point is a source of control of the chemical reactivity and other characteristics of the carbonaceous products of this invention.

The carbonization may be carried out as a continuation of a batch-operated catalyzing step wherein, particles being catalyzed having been held at the desired temperature for the specified residence time, the temperature of the bed is raised as rapidly as the reaction of the oxygen content of the fluidizing medium with the bed will achieve carbonization temperatures. Or, preferably, this carbonization may be carried out continuously feeding the catalyzed coal from the catalyzing stage directly into a fluid bed maintained at the carbonizing temperatures as previously described. In this case the heat transfer rates within the bed are of such a magnitude as to effect instantaneous shock heating of the particles.

Unless the parent coal particles have been treated as prescribed in the catalyzing stage, irreversible expansion of the particles results from non-elastic rupture and explosion of the pore walls. The resulting chars do not have the high reactivity with carbon dioxide, oxygen or steam, do not react uniformly with these media and are markedly weaker and less resistant to abrasion than the chars produced by following the conditions hereinabove set forth. It is only by following the sequence of stages above described that high density, high strength, uniformly reactive and highly reactive calcinate particles result.

The calcining stage

The char particles from the carbonization stage are further heated to reduce the amount of volatile combustible matter remaining in the end product to below 5%, preferably 3%. Desirably, this calcination is achieved in a fluid bed operating at that minimum temperature necessary to achieve this reduction, i.e., from about 1400° F. to 1500° F., and for a residence time of from about 7 minutes to about 60 minutes. Higher temperatures may, however, be used but not exceeding about 1800° F. At an operating range of 1500° F. to 1800° F. residence times in excess of 10 minutes effect a reduction in the chemical reactivity of the calcined product proportional to the length of the residence time in excess of 10 minutes. A secondary effect of this calcining is to increase the physical strength of the calcinate.

The residence times of the char in this stage are dictated by the specification of the final product and are more or less dependent on the operating temperature. At minimum temperature, sufficient residence time to reduce the volatile combustible matter to below 5%, preferably 3%, is required. Practically, this limit is 10 minutes at about 1400° F. to 1500° F. and should not be less than 7 minutes even at 1800° F.

The fluidizing atmosphere necessary in this stage should be free of reactive gases such as carbon dioxide or steam. Oxygen can be tolerated only in such an amount as is demanded by that oxidation rate of the char necessary to supply the heat demands of this stage. This oxygen is most practically obtained from air introduced as part of the otherwise chemically inert fluidizing medium.

The remaining components of the fluidizing medium may be carbon monoxide, hydrogen, nitrogen and flue gas in which carbon dioxide and water have been reduced to carbon monoxide and hydrogen by previously passing the flue gas over a bed of hot carbon, or otherwise.

This fluidizing medium should be introduced at such pressures as are consistent with smooth operation of the fluidization process; a range of from 0 to 30 p.s.i.g., preferably about 2 p.s.i.g., is satisfactory. The velocity of this medium should be consistent with a proper fluidizing pattern, or the same as the carbonization stage, e.g., 0.5 to 2 feet per second.

It is advantageous to introduce the fluidizing medium at about the operating temperature of the bed. Lower than bed temperatures will demand increased oxidation of the char, with resulting deleterious effect of water vapor and carbon dioxide on the final product.

The heating may be accomplished as a continuation of the catalyzing and carbonizing stages, in the same batch-operated fluidized bed reactor, by raising the temperature of the bed to the desired calcining range and holding the bed at that range until calcination has been completed. Or, preferably, the hot char may be introduced continuously and directly to a fluidized bed operating at the specified calcining temperature. In this case, the rate of heat transfer in the fluid bed is of such magnitude as to effect shock or instantaneous heating of the char to calcining temperature.

Unless the parent coal has been treated as prescribed in the catalyzation and carbonization stages, this shock heating will shatter the particles, producing extremely low apparent density, high exploded fines. Such particles give evidence that the structure, density and fracture of the parent coal have been completely, adversely and permanently altered.

Carbonaceous material B was produced from a bituminous coking coal, namely, lower Pitts, Connelsville, in a commercial by-product coke oven. It is a commercial coke.

Carbonaceous material C was also produced from a bituminous coking coal, the same as that employed in making carbonaceous material B, but the coal was coked in a beehive oven. It is a commercial beehive coke.

Carbonaceous material D was produced by coking petroleum still bottoms on a moving grate where the

TABLE 2

|  | I | II | III | IV | V |
|---|---|---|---|---|---|
| Specific species | Elkol-Adaville seam. | D.O. Clarke No. 7. | Castlegate-D. | Illinois No. 6. | Lignite "Sandow." |
| Location | Kemmerer, Wyoming. | Superior, Wyoming. | Kenilworth, Utah. | Burning Star No. 1 Mine. | Rockdale, Texas. |
| Rank | Sub-bituminous "B." | Sub-bituminous "A." | Bituminous "B." | Bituminous "B." | Lignite. |
| Agglomerating Properties. | Non-agglomerating. | Non-agglomerating. | Non-coking. | Weakly coking. | |

GENERAL ANALYSIS

|  | I | II | III | IV | V |
|---|---|---|---|---|---|
| Heating value (Ash free-gross B.t.u.) | 10,700 | 12,300 | 13,450 | 13,600 | 10,757 |
| Moisture | 18 | 11.4 | 2.6 | 4 | 25.2 |
| VM | 42.7 | 43.5 | 42.1 | 36.9 | 49.8 |
| Fixed carbon | 53.2 | 57.5 | 48.4 | 54 | 34.8 |
| Ash | 4.1 | 3.5 | 6.9 | 9.7 | 15.4 |

ELEMENTAL ANALYSIS

|  | I | II | III | IV | V |
|---|---|---|---|---|---|
| C | 70.8 | 74.9 | 72.9 | 73.3 | 61.3 |
| $H_2O$ | 5.2 | 5.7 | 5.6 | 4.96 | 4.41 |
| $O_2$ | 18.8 | 15.1 | 13.97 | 9.53 | 16.98 |
| N | 0.9 | 1.5 | 0.63 | 1.37 | 1.25 |
| S | 0.9 | 0.7 | 0.48 | 2.20 | 1.99 |
| Ash | 3.4 | 2.0 | 6.42 | 8.64 | 14.07 |

*The cooling stage*

The calcinate must be cooled rapidly and immediately to prevent loss of reactivity unless it is used immediately. This cooling, desirably, is effected in one or more fluidized beds, preferably two, in which the fluidizing medium also serves as the cooling medium and in which the heat transfer rate is of such magnitude as to effect instantaneous cooling. Suitable cooling media are flue gas, nitrogen, or carbon monoxide, introduced at a temperature to effect the desired cooling and at a velocity to effect the desired fluidization. The velocity may be substantially the same as that employed during the carbonization or calcination treatments. Cooling atmospheres containing appreciable amounts of oxygen, water vapor or carbon dioxide should be avoided because, in view of the highly reactive nature of the calcined char, such atmospheres may result in deleterious effects on the calcinate.

As noted above, Table 2 identifies the different ranks of coal used to produce products I to V, inclusive, the chemical and physical properties of which are given in Table 1 above. The values for moisture, volatile matter, fixed carbon, ash and elemental analysis are in weight per cent and with the exception of the moisture values, are all on a dry basis. The Roman numerals I to V, inclusive, in Table 2 indicate the starting coal employed to make the carbonaceous products I to V, inclusive, respectively.

Of the comparative carbonaceous materials, carbonaceous material A was produced from a sub-bituminous coal, namely, Adaville Elkol, the same as used in producing carbonaceous product I. Carbonaceous material A was made by passing the coal through a Lurgi shaft kiln where the coal was heated at a maximum temperature of 1900° F.

petroleum residue was heated to a temperature of 2000° F.

Table 3, giving the conditions employed in making products I to V, inclusive, follows:

TABLE 3

|  | I | II | III | IV | V |
|---|---|---|---|---|---|
| Catalyzing: | | | | | |
| Length of run, hours | 87 | 8.5 | 10 | 13.4 | 10 |
| Total solids fed, lbs | 8,552 | 47.9 | 58 | 37.5 | 54 |
| Catalyzer inside diameter, inches | 10.02 | 3.07 | 3.07 | 3.07 | 3.07 |
| Temperature of fluid bed, ° F | 372 | 350 | 350 | 600 | 350 |
| Residence time, minutes | 25 | 33 | 26 | 44 | 36 |
| Fluidizing medium: | | | | | |
| Superficial velocity, ft./sec | 0.86 | 0.5 | 0.5 | 0.8 | 0.4 |
| Composition, volume percent: | | | | | |
| Oxygen | 2.0 | 1.2 | 1.1 | 1.4 | 1.2 |
| Nitrogen | 7.0 | 36.3 | 40.4 | 38 | 36.2 |
| Steam | 91.0 | 62.3 | 58.5 | 60.6 | 62.6 |
| Carbonizing: | | | | | |
| Length of run, hours | 87 | 4.6 | 11.5 | 9.3 | 11 |
| Total solids fed, lbs | 7,340 | 29.8 | 27 | 19.4 | 33 |
| Carbonizer inside diameter, inches | 10.02 | 3.07 | 3.07 | 3.07 | 3.07 |
| Temperature of fluid bed, ° F | 870 | 800 | 820 | 850 | 950 |
| Residence time, minutes | 53 | 21 | 46 | 32 | 61 |
| Fluidizing medium: | | | | | |
| Superficial velocity, ft./sec | 0.88 | 0.8 | 0.7 | 1 | 0.65 |
| Composition, volume percent: | | | | | |
| Oxygen | 5.0 | 3.3 | 3.2 | 4.2 | 5.2 |
| Nitrogen | 19.0 | 43.1 | 49.5 | 45.2 | 58 |
| Steam | 76.0 | 53.6 | 47.3 | 50.6 | 36.8 |
| Calcining: | | | | | |
| Length of run, hours | 87 | 5 | 5.5 | 6.6 | 7 |
| Total solids fed, lbs | 4,620 | 23.4 | 19 | 13.2 | 18 |
| Calciner inside, diameter, inches | 12 | 3.07 | 3.07 | 3.07 | 3.07 |
| Temperature of fluid bed, ° F | 1,490 | 1,655 | 1,610 | 1,650 | 1,600 |
| Residence time, minutes | 21 | 22 | 16 | 37 | 62 |
| Fuidizing medium: | | | | | |
| Superficial velocity, ft./sec | 0.54 | 1.2 | 1 | 0.9 | 0.7 |

TABLE 3—Continued

|  | I | II | III | IV | V |
|---|---|---|---|---|---|
| Calcining—Continued | | | | | |
| Composition, volume percent: | | | | | |
| Oxygen | 11.0 | 8 | 11.2 | 9.7 | 11.1 |
| Nitrogen | 89.0 | 92 | 88.8 | 90.3 | 88.9 |
| Cooling: | | | | | |
| Temperature of fluid bed, °F | 400 | 150 | 150 | 150 | 150 |
| Composition of fluidizing medium, volume percent | ¹(100) | ¹(100) | ¹(100) | ¹(100) | ¹(100) |
| Temperature of fluidizing medium, °F | 80 | 80 | 80 | 80 | 80 |

¹ Nitrogen.

The invention accordingly comprises a carbonaceous material possessing the characteristics, properties and chemical composition hereinabove described. It is to be understood, however, that this invention is not restricted to the present disclosure otherwise than as defined by the appended claims.

What is claimed is:

1. A particulate amorphous carbonaceous material derived from coal by heating the coal in particulate form in three stages consisting of: first, a catalyzing stage in which the coal is heated in the presence of oxygen to a temperature below that at which tar-forming vapors begin to be evolved; second, a carbonization stage in which the catalyzed coal particles from the first stage are heated to evolve tar-forming vapors therefrom and form reactive char particles; and third, a calcining stage in which the char from the second stage is heated to a still higher temperature to reduce the volatile content of the chair, this char constituting the said particulate amorphous carbonaceous material; the particles of which particulate amorphous carbonaceous material have (a) a carbon content on a moisture and ash free basis of at least 90% by weight; (b) a reactivity with carbon dioxide above 10% by weight measured by the amount of a sample of the carbonaceous material, sized to pass through a 20-mesh but retained on a 28-mesh screen, consumed in one hour in a stream of carbon dioxide at 900° C. passed over the sample at a rate of 400 ml. per minute; (c) a real density of from 1.6 to 2 grams per cubic centimeter; (d) a ratio of apparent helium density to real density within the range of from 1.3 to 2.5; (e) a surface area (BET nitrogen) of from 50 to 500 square meters per gram; (f) an orientation index factor within the range of from 1.2 to 2.8; (g) a carbon to hydrogen ratio on a weight basis of from 60 to 90; and (h) their surfaces susceptible to the formation of strong carbon to carbon bonds with carbon derived from a bituminous binder.

2. A particulate amorphous carbonaceous material derived from coal by heating the coal in particulate form in three stages consisting of: first, a catalyzing stage in which the coal is heated in the presence of oxygen to a temperature below that at which tar-forming vapors begin to be evolved; second, a carbonization stage in which the catalyzed coal particles from the first stage are heated to evolve tar-forming vapors therefrom and form reactive char paritcles; and third, a calcining stage in which the char from the second stage is heated to a still higher temperature to reduce the volatile content of the char, this char constituting the said particulate amorphous carbonaceous material; the individual particles of which particulate amorphous carbonaceous material have (a) a carbon content on a moisture and ash free basis of at least 90% by weight; (b) a reactivity with carbon dioxide above 15% by weight measured by the amount of a sample of the carbonaceous material, sized to pass through a 20-mesh but retained on a 28-mesh screen, consumed in one hour in a stream of carbon dioxide at 900° C. passed over the sample at a rate of 400 ml. per minute; (c) a reactivity with steam of above 20% by weight, measured by the amount of a sample of the carbonaceous material, sized to pass through a 20-mesh but retained on a 28-mesh screen, consumed in one hour in a stream of steam at 825° C. passed over the sample at a rate of 133 ml. per minute; (d) a real density of from 1.6 to 2 grams per cubic centimeter; (e) a ratio of apparent helium density to real density within the range of from 1.3 to 2.5; (f) a surface area (BET nitrogen) of from 50 to 500 square meters per gram; (g) an orientation index factor within the range of from 1.2 to 2.8; (h) a carbon to hydrogen ratio on a weight basis of from 60 to 90; (i) a hardness of about 6 on the MOH scale; and (j) their surfaces susceptible to the formation of strong carbon to carbon bonds with carbon derived from a bituminous binder.

References Cited by the Examiner

UNITED STATES PATENTS

| 2,008,148 | 7/35 | Morrell | 252—445 X |
| 2,407,268 | 9/46 | Goss | 252—421 |
| 2,549,298 | 4/51 | Donnegan | 252—445 |
| 2,648,637 | 8/53 | Rodman | 252—444 |
| 2,732,333 | 1/56 | Smith | 202—35 X |
| 2,734,851 | 2/56 | Smith | 202—31 X |
| 2,805,189 | 9/57 | Williams | 202—20 X |
| 2,835,343 | 5/28 | Wolff et al. | 252—444 |
| 2,922,752 | 1/60 | Reintjes | 202—35 X |
| 3,001,237 | 9/61 | Balaquer | 252—502 |
| 3,018,227 | 1/62 | Baum et al. | 202—26 |

OTHER REFERENCES

Desirable Characteristics of Coke, J. D. Davis from Reports of Investigations—Dept. of Commerce—Bureau of Mines, Serial No. 2,884, July 1928.

MORRIS O. WOLK, *Primary Examiner*.

RICHARD D. NEVIUS, ALPHONSO D. SULLIVAN, *Examiners*.